June 3, 1958  M. LOEB  2,837,366
MAGNETIC CATCH
Filed Dec. 24, 1956
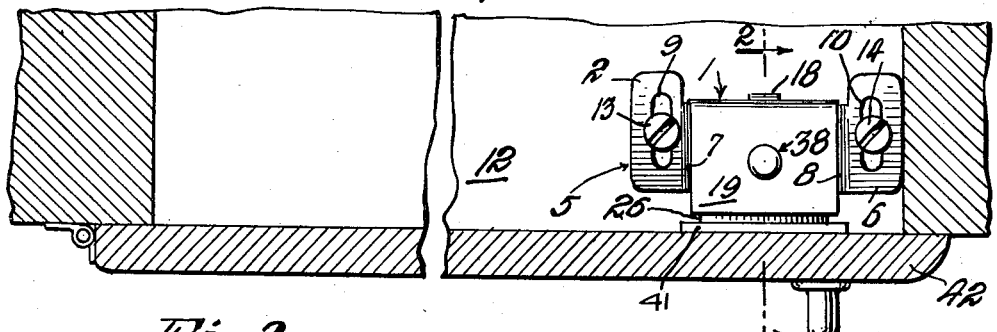
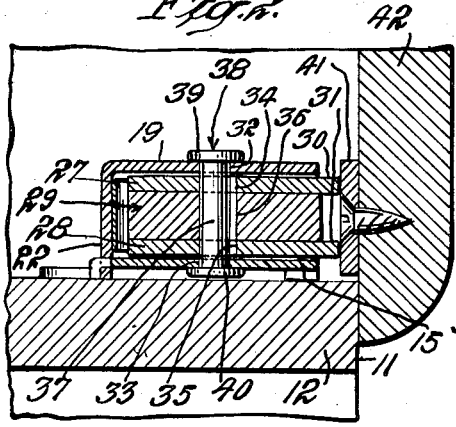
INVENTOR.
MORRIS LOEB
BY
his ATTORNEY

United States Patent Office 2,837,366
Patented June 3, 1958

2,837,366

MAGNETIC CATCH

Morris Loeb, New York, N. Y.

Application December 24, 1956, Serial No. 630,318

3 Claims. (Cl. 292—251.5)

This invention relates to catches in general such as magnetic catches extensively used for kitchen cabinets and the like.

Among the objects of the present invention it is aimed to provide an improved magnetic catch, especially adapted for kitchen cabinets and the like, which can be produced at a minimum cost, can be readily and expeditiously assembled, can be readily and expeditiously secured in place, will remain in working operation indefinitely and consequently is free from any upkeep expense and is durable.

It is still another object of the invention to provide an improved magnetic catch which will automatically position, adjust or accommodate itself to the many imperfections in structures with which these catches are used and durable enough to withstand the abuse and heavy usage to which they are frequently subjected.

These and other features, capabilities and advantages of the invention will appear from the subjoined detailed description of specific embodiments thereof illustrated in the accompanying drawings in which—

Fig. 1 is a section of a cabinet frame and door equipped with the two part structure of the improved magnetic latch made according to one embodiment.

Fig. 2 is a section on the line 2—2 of Fig. 1.

Fig. 3 is an enlarged plan view of the magnet and magnet containing housing, shown in Fig. 1, with the upper wall removed.

Fig. 4 is an end elevation of the magnet and magnet containing housing, shown in Fig. 3.

Fig. 5 is an exploded perspective of the two sections constituting the magnet containing housing, shown in Fig. 1.

Fig. 6 is a section similar to Fig. 2 of a second embodiment.

In the embodiment shown in Figs. 1–5, inclusive, there is illustrated a housing 1 comprising a base section 2 and an upper chamber forming section 3. The base 2 is provided with a main plate portion 4 parallel to the plane of the enlarged ears 5 and 6, but at a different level, the plate 4 being defined from the ears 5 and 6 by the shoulders 7 and 8, respectively. In the ears 5 and 6 there are provided two elongated slots 9 and 10, respectively, to facilitate adjustment of the plate 4 relative to the edge 11 of the shelf or platform or first frame member 12 or the like, to which the base 2 is attached by screws 13 and 14 or the like.

The plate 4 has its front portion 15 extending beyond the front edges of the ears 5 and 6 and the rear end portions of the ears 5 and 6 in turn extend rearwardly beyond the rear edge of the plate 4. Furthermore, there are formed triangular recesses 16 and 17 at the lateral ends of the front portion 15, and a downwardly bent tongue 18 extending from the intermediate part of the rear edge of the plate 4.

The chamber forming section 3 comprises an upper wall or roof 19, two side walls 20 and 21 extending substantially vertical to the wall 19 and a rear wall 22 extending at right angles to said wall 19 and along and in an engagement with the rear edges of the side walls 20 and 21. The rear wall 22 is provided with a slot 23 extending parallel to the free edge of the wall 22 and adjacent its free edge to receive the tongue 18 of the plate 4. In turn there are provided tongues or projections 24 and 25 extending from the front end portion of the free edges of the side walls 20 and 21 to enter the recesses 16 and 17, respectively, of the plate 4, whereupon they are bent over into engagement with the outer face of the plate 4, see Fig. 4.

Between the wall 19 and the plate 4 there is anchored the magnet unit 26 which consists, in line with convention, of two outer metal plates 27 and 28 responsive to the magnetic force of a magnet 29, which may be natural or synthetic.

Excellent results have been achieved when the magnet 29 is composed of the composition of magnet extensively sold in the United States market under the trade name "Alnico."

When the section 3 is rectangular in conformation, then the plates 27 and 28, and the magnet 29, are preferably rectangular in conformation with the rear edges of the plates 27 and 28 and of the magnet 29 preferably in alinement with one another, and the side edges of the plates 27 and 28 and of the magnet 29, preferably in alinement with one another, but with the front portions 30 and 31 of the plates 27 and 28 preferably extending not only forwardly of the front edge of the magnet 29, but also forwardly of the front edges of the wall 19 and of the portion 15, as shown in Fig. 2. Furthermore, the side edges and the rear edges of the plates 27 and 28 and of the magnet 29 are spaced from the side walls 20 and 21 and the rear wall 22 of the section 3, as shown in Figs. 3 and 4.

The embodiment, shown in Figs. 1–5, inclusive, departs from the embodiment shown in Fig. 6, primarily in the means used movably to anchor the magnet unit 26 in place. In the embodiment, shown in Figs. 1–5, inclusive, the wall 19, plates 4, 27 and 28, and magnet 29, are provided with alined openings 32, 33, 34, 35 and 36, respectively, with the openings 32 and 33 substantially of the same size and conforming to the diameter of, and receiving, the shank 37 of the rivet 38 having a head 39 engaging the outer face of the wall 19 and the head or upset portion 40 engaging the outer face of the plate 4 to anchor the magnet unit 26 to the wall 19 and plate 4.

The openings 34, 35 and 36 are considerably larger than the diameter of the shank 37 to enable the magnet unit 26 freely to move relative to the shank 37 and in turn cooperating with the clearances of the magnet unit 26 from the side walls 20 and 21 and the rear wall 22 to position itself according to the position of the abutment, such as the contact plate 41 on the door or second frame member 42. The plate 41 is composed of a metal which is responsive to the magnetic force of the magnet 29.

In the embodiment shown in Fig. 6, the magnet 43 in outer conformation corresponds to the outer conformation of the magnet 29 and is provided with an intermediate opening 44 to receive the projections 45 and 46 conformed in the plates 47 and 48 to fixedly secure the plates 47 and 48 to the magnet 29. The plates 47 and 48 correspond to the plates 27 and 28 of the embodiment shown in Fig. 2. The plates 47 and 48 are also provided with intermediate depressions 49 and 50 to receive the projections 51 and 52 in the wall 53 and plate 54, respectively. The depressions 49 and 50 are larger than the projections 51 and 52, respectively, to anchor the magnetic unit 55 to the wall 53 and plate 54 to allow for movement of the magnetic unit 55 relative to such wall 53 and plate 54. The word "anchor" is here used to define movement of the magnet anchored relative to the housing, as is the case with the movement of a boat anchored to a mooring.

Although excellent results have been achieved with the two embodiments as so far described, it has been found that in the interest of reducing the noise to a minimum, resulting from opening and closing a door, such as the door 42, particularly when closing the door, if a flat spring, such as the sinusoidal shaped spring 56, were positioned in the space between the inner face of the wall 22 and the rear ends of the magnetic unit 26, of the embodiment illustrated in Fig. 2, and between the inner face of the wall 57 and the rear ends of the magnetic unit 55, then any undue chattering with consequent noise of the magnet units 26 and 55 will be substantially, if not entirely eliminated.

Excellent results have been achieved when the rear face of the intermediate portion 58 of the spring 56 engages the rear wall 22 and the front faces of the loops 59 and 60 engage the magnet units 26 and 55. The spring 56 will yield to enable the outer edges of the front portions 30 and 31 to accommodate themselves to the face of the plate 41, thus not interfering with the adjustability of the magnet unit 26 and otherwise preventing chattering of the magnet unit 26.

As shown in Fig. 4, the outer faces of the ears 5 and 6, the outer faces of the projections 24 and 25, and the outer edge of the rear wall 22 are substantially in alinement with one another and all engage the face of the shelf or platform 12 in the interest of rigidity and stability.

The sections 1 and 2 are preferably each composed of one piece and of metal.

It is obvious that various changes and modifications may be made to the details of construction without departing from the general spirit of the invention as set forth in the appended claims.

I claim:

1. In a magnetic catch for relatively movable frames comprising a metal housing adapted to be secured to a first frame and containing a magnetic unit for cooperation with a metal contact plate responsive to a magnetic force adapted to be secured to a second frame, said housing characterized by a base adapted to be secured to said first frame and having attachment ears and an outer face, the ears having structure engaging faces engaging said first frame parallel to but offset from the outer face of the base to form a clearance between said ears, a one piece chamber forming section having an outer wall, two side walls and a rear wall, said base having a rear edge, a tongue intermediate said rear edge, said side walls having projections adjacent their front ends, said rear wall having an intermediate slot to receive said tongue and said base having recesses at the outer ends thereof to receive the projections of said side wall, said projections being bent across said base with their outer faces in alinement with the structure engaging faces of said ears and the free edge of said rear wall being in alinement with the structure engaging faces of said ears to enable said ears, free edge of said rear wall and projections, all to engage the structure to which the device is attached, a magnetic unit anchored to, but movable between, said outer wall and said base, said magnetic unit having parallel metal plate portions throughout their width projecting from the front edges of said outer wall and base for engagement with said contact plate, a magnet disposed between said metal plate portions with its front edge spaced inwardly from the front edges of said metal plate portions, said magnet and plate portions being rectangular in shape and movable to and from said side walls and rear wall, and means anchoring said magnetic unit to said base and outer wall.

2. The combination as set forth in claim 1 in which said anchoring means consist in said magnetic unit, outer wall and base having alined openings, with the opening in said magnetic unit larger than the openings in said outer wall and base, and a rivet extending through said openings and secured to said outer wall and base, said rivet having a shank smaller in diameter than the opening in said magnetic unit to allow freedom of movement of said magnetic unit for adjustment.

3. In a magnetic catch for relatively movable frames comprising a housing adapted to be secured to a first frame and containing a magnetic unit for cooperation with a contact plate adapted to be secured to a second frame, said housing characterized by a base adapted to be secured to said first frame and having attachment ears and an outer face, the ears having structure engaging faces engaging said first frame parallel to but offset from the outer face of the base to form a clearance between said ears, a one piece chamber forming section having an outer wall, two side walls and a rear wall, said base having a rear edge, a tongue intermediate said rear edge bent at right angles to the base and terminating at a level with the structure engaging faces of said ears, said side walls having projections adjacent their front ends, said rear wall having an intermediate slot to receive said tongue and said base having recesses at the outer ends thereof to receive the projections of said side wall, said projections being bent across said base with their outer faces in alinement with the structure engaging faces of said ears and the free edge of said rear wall being in alinement with the structure engaging faces of said ears to enable said ears, free edge of said rear wall, tongue and projections, all to engage the structure to which the device is attached, a magnetic unit anchored to, but movable between, said outer wall and said base, said magnetic unit having parallel metal plate portions throughout their width projecting from the front edges of said outer wall and base for engagement with said contact plate, a magnet disposed between said metal plate portions with its front edge spaced inwardly from the front edges of said metal plate portions, said magnet and plate portions being rectangular in shape and movable to and from said side walls and rear wall, means anchoring said magnetic unit to said base and outer wall, and a sinusoidal flat spring tensed between said rear wall and the rear end of said magnetic unit and extending substantially the full width from one side wall to the other.

References Cited in the file of this patent
UNITED STATES PATENTS

| | | |
|---|---|---|
| 2,240,035 | Catherall | Apr. 29, 1941 |
| 2,701,158 | Schmitt | Feb. 1, 1955 |